Oct. 18, 1938.    L. A. MILLER    2,133,558
COUPLING DEVICE
Filed March 19, 1938
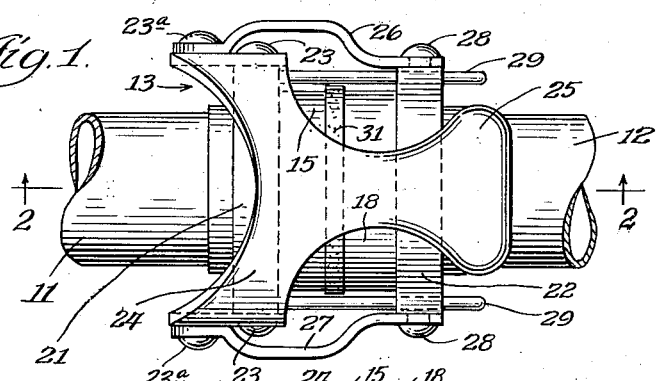
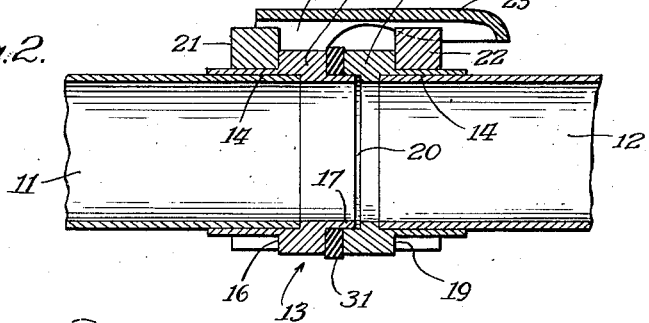
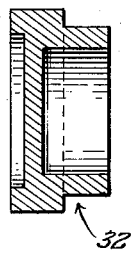
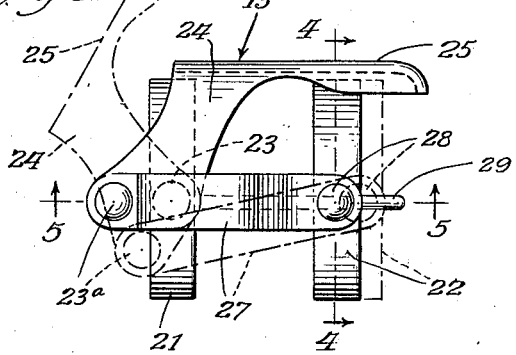
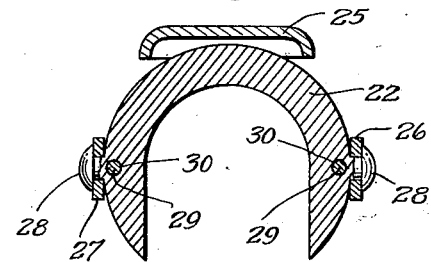
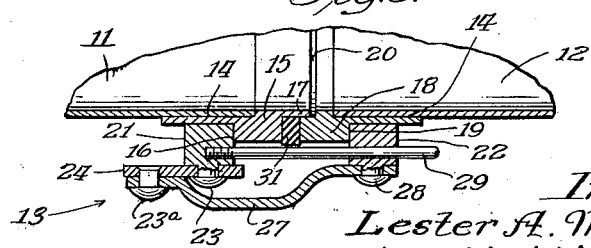
Inventor
Lester A. Miller.
By Mayfield Weisbrod
Attorney.

Patented Oct. 18, 1938

2,133,558

UNITED STATES PATENT OFFICE 2,133,558

COUPLING DEVICE

Lester A. Miller, Fairfield, Iowa

Application March 19, 1938, Serial No. 196,953

6 Claims. (Cl. 285—171)

This invention relates to a coupling device, and has for its prime object to provide a coupling device which can be readily mounted on separate conduit sections to couple same together in a minimum of time and effort and which can likewise be readily disassociated and removed from said sections.

Another object is to provide a coupling device which can be secured to the opposing ends of the conduit sections by simply placing same thereon, thereby obviating the necessity of fastening same to the conduit sections as heretofore required.

Another object is to provide a coupling member which is axially mounted on the conduits and which is longitudinally and circumferentially movable thereon and which has means for positioning the conduit ends in proper alignment.

Certain liquids, more particularly milk and the like are conveyed through pipes or conduits, which are made up of a plurality of separate sections joined together by coupling means or the like. Due to the necessity of frequently cleaning the conduits, the sections have to be separated from each other, requiring frequent coupling and uncoupling of the parts at various places along the length of the piping line. To attach and detach coupling devices of the kind previously used, considerable time and effort was entailed and a partial suspension of operation resulted during such cleaning period. Also with such prior art constructions, considerable loss of fluid in conduit or tubing as well as frequent maintenance and replacement of coupling parts due to damage was very objectionable. Furthermore with such prior art constructions the coupling device was not completely removed or disassociated from the conduit during the cleaning operation, and consequently, it was impossible to completely clean same. However, with my invention all of the objectionable features inherent in the prior art constructions are eliminated, and I have provided a device which can be readily mounted on the conduit sections for quickly coupling same and which can be completely removed from the conduits in a minimum time and with minimum effort.

While my invention is particularly suitable for use in dairies wherein milk is piped, it will be understood that my invention can be used equally as well wherever coupling devices are required.

In the drawing

Fig. 1 is a plan view showing my improved coupling device, coupling the ends of two separate conduit sections.

Fig. 2 is a cross sectional view taken on line 2—2 of Fig. 1.

Fig. 3 is a side elevational view showing my invention, and showing in dotted lines, the position that the parts assume for effecting uncoupling of the conduit sections.

Fig. 4 is a cross sectional view taken on line 4—4 of Fig. 3.

Fig. 5 is a fragmentary cross sectional view taken on lines 5—5 of Fig. 3, and additionally showing the conduits coupled together.

Fig. 6 is a cross sectional view of a cap which can be coupled to the end of the conduit for closing same.

As shown in Figures 1 and 2, the conduits 11 and 12 are coupled together with my coupling device generally indicated at 13. Welded or otherwise permanently secured as at 14 to the end of conduit 11 is a ring member generally indicated at 15 which is formed to provide an annular shoulder 16 and a lip portion 17.

Similarly mounted on the end of the conduit 12 is a ring member generally indicated at 18 which is formed to provide a shoulder 19 and an annular recess 20 for receiving the lip 17 of the ring member 15. As shown when the conduits are coupled together, the exposed internal circumferences of the ring members 15 and 18 are the same as the internal circumferences of the conduits.

Referring specifically to the coupling device 13, I provide a pair of open or C shaped collars 21 and 22. Straddling the collar 21 and pivotally secured thereto as by pivot pins 23 is an operating lever generally indicated as 24 which has a handle extension 25. Pivotally secured as by pivot pins 23a to the lever 24 (rearwardly of the pivotal connection between the collar and lever) are a pair of substantially U-shaped links 26 and 27 made of resilient material, which extend forwardly and are pivotally secured to the other collar 22 as by pivot pins 28.

Permanently secured to the collar 21 are a pair of aligning bars 29 which are adapted to slide within the openings 30 formed in the collar 22. Said bars serve to maintain said collars in proper longitudinal alignment with respect to each other, and thus serve to position the conduit ends in proper end to end relationship prior to joining or coupling of same. If it is desired to couple the conduits 11 and 12 together, a gasket 31 is placed on the lip 17 and the ends of the conduits are positioned adjacent each other with the lip fitting within the recess 20. The lever 24 through the handle extension 25 is moved to the position shown in dotted line in Figure 3, causing the links 26 and 27 and collar 22 to assume the position shown also in dotted lines with the spacing increased between the collars 21 and 22. The coupling member is then axially placed over the conduits so that the collars 21 and 22 rest adjacent the respective shoulders on said conduits. The operating lever 24 is then depressed, moving the links 26 and 27 into longitudinal position and moving the collar 22 longitudinally rearward to decrease the space between said collars. This will cause the collars to bear against the shoulders of the rings and move same together, thus, coupling said conduits 11 and 12. With the gasket 21 positioned therebetween the shape and the resilient material of the links 26 and 27, provide the necessary compressive pressure between said conduits to effect a leak proof seal.

If it is desired to close one end of the conduit instead of having two conduits coupled together, I provide a closure cap 32 such as shown in Fig. 6. This closure cap is placed on the lip portion 17 and coupled to the conduit 11 by my coupling device in the manner as described with respect to coupling of conduit 12.

My coupling device can be longitudinally and circumferentially moved on the conduits and is moved axially with respect to the conduits when attaching and removing same.

What I desire to secure by Letters Patent is:

1. In a coupling device comprising a pair of open collars, connecting links between said collars, a lever for operating said links and causing spacing of said collars with respect to each other, a bar for aligning said collars.

2. In a coupling device comprising a pair of open collars adapted to permit quick axial placement thereof on separate conduit sections, connecting means between said collars, a lever for operating said connecting means to cause said collars to move with respect to each other.

3. In a coupling device comprising a pair of open faced collars adapted to permit axial placement thereof on conduit sections, means for moving said collars towards each thereof, members associated with said collars for aligning said collars with respect to each other.

4. In a coupling device for uniting conduits together, said device including a pair of open collars adapted to be longitudinally and circumferentially movable on said conduits and axially movable relative thereto, means connecting said collars, and an operating handle for operating said means to cause said collars to move longitudinally with respect to each other.

5. In a coupling device for uniting conduits together, said device including a pair of collars adapted to be longitudinally and circumferentially movable on said sections and axially movable relative thereto, means connecting said collars, an operating handle for operating said means to cause said collars to move longitudinally with respect to each other, bars associated with said collars for aligning same.

6. A readily attachable and detachable coupling for joining conduit ends, said coupling comprising a pair of open collars, each adapted to be attached and detached from the conduits by moving said collars at right angles to and from the longitudinal axis of the conduits, a plurality of alignment bars secured to said collars and adapted to align said conduit ends, an operating lever pivotally secured to one collar, a pair of substantially U shaped link members pivotally secured to said other collar and pivotally secured to said operating lever, said operating lever adapted when raised to swing the link members at an angle with respect to the longitudinal axis of said conduits and simultaneously slide said latter mentioned collar longitudinally on said conduit out of coupling position, said lever when lowered adapted to slide said last mentioned collar longitudinally into coupling position.

LESTER A. MILLER.